March 13, 1934.  J. L. STAFFORD  1,950,576
AUXILIARY LENS
Filed Nov. 16, 1931
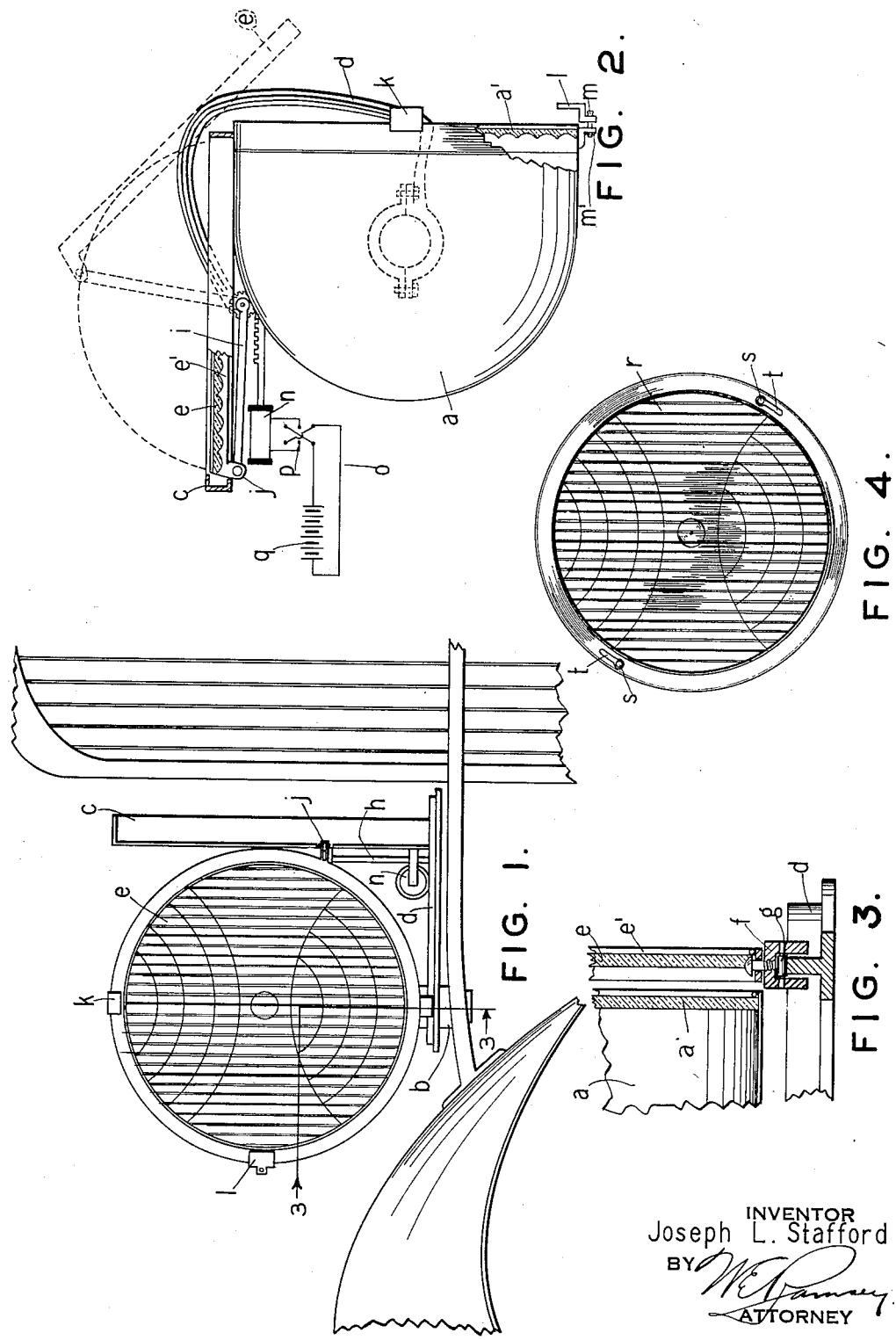
INVENTOR
Joseph L. Stafford
BY
ATTORNEY Patented Mar. 13, 1934

1,950,576

UNITED STATES PATENT OFFICE 1,950,576

AUXILIARY LENS

Joseph L. Stafford, Portland, Oreg.

Application November 16, 1931, Serial No. 575,337

2 Claims. (Cl. 240—41.3)

My invention relates to lights carried by vehicles, by which objects in the path of such vehicle may be illuminated, and relates more particularly to headlights of automobiles. Lights of this character are very effective when the air is clear, but in fog or heavy mist the beam of light directed forwardly from the vehicle seemingly makes said fog or mist luminescent and opaque and in many cases vision is better had without the use of lamps. The beams directed from said lamps are refracted by divergent lenses in most constructions to produce a relatively shallow band of light but one which is quite broad, so as to illuminate the road surface in advance of the vehicle to prevent the direct rays of lights from shining directly into the driver of the vehicle coming from the opposite direction. So-called fog lights are frequently provided with lenses, or reflectors, or both, which produce a converging or focusing beam of light of relatively high intensity because of said contraction, which beam of light, because of concentration, more effectively produces illumination of the road surface in advance of the vehicle. Such fog lights are necessarily of small size, as they would otherwise be out of proportion with respect to the headlights.

The object of my invention is to provide means by which the divergent beams of light from the headlights can be contracted and directed, preferably by colored auxiliary lenses, to produce efficient illumination of the road surface.

The specific details of my invention and the mode of construction are hereinafter described with reference to the accompanying drawing, in which:

Fig. 1 is a front elevation of a vehicle headlight in which portions of an automobile are shown as the supporting medium for said light;

Fig. 2 is a plan view of said light with the auxiliary lens shown housed and in inoperative position, the movement of said auxiliary lens toward operative position being indicated by dotted lines;

Fig. 3 is a vertical section taken thru the light on the line 3—3 in Fig. 1, in which the auxiliary lens is shown in operative position; and Fig. 4 is a fragmentary elevation of a more simple modification of my invention.

I have shown my invention in connection with an automobile headlight $a$ for the purpose of illustration, but it is to be understood that my invention is not limited exclusively to the headlights of an automobile, but is equally adapted for any vehicle and for any use where it is desirable to change the character of a beam of light, so that it will be broad and divergent in clear weather and convergent, directed and preferably colored for foggy or misty weather.

The headlight is normally carried by a base $b$, either upon the frame of an automobile, or upon the fender thereof. I provide a housing $c$ extending generally longitudinal of the automobile and opening away from the headlight. A track member is secured at one end to the bast $b$ of the headlight and at the other end adjacent the middle of the bottom edge of the housing $c$.

The auxiliary means $e$, properly carried by a mounting $e'$, rests upon said track thru the medium of a slide $f$. The track is preferably T-shaped in section and the slide is preferably U-shaped and straddling and riding upon the median flange of the track. To produce easy action for said slide upon the track, I preferably provide an anti-friction bearing $g$, which supports the slide. Said bearing preferably is rotatable, so that the sides of the slide may have close engagement with the sides of the track.

A pivotal operating rod $h$ is provided with a laterally extending arm $i$, the free end of the latter engaging the lens mounting $e'$ at one edge by a pivotal joint $j$. The arm is proportioned to the curvature and position of the track $d$, so as to permit the arm to swing from extended position in one direction to extended position in the other, and in said two positions to move auxiliary lens from registration with the principal lens $a'$ of the headlight $a$ into housed position in the housing $c$, which movement is diagrammatically illustrated in Fig. 2.

I preferably provide one or two clips at the marginal edge of the headlight, which engage the lens or its mounting $e'$ when said lens $e$ is in registration with the lens $a'$. One of said clips $k$ is arranged at the upper edge of the headlight and is relatively fixed. The other clip $l$ arranged at the side of the headlight is preferably carried by a threaded post $m$, provided with a suitable locknut $m'$. This serves to permit slight angular adjustment of the auxiliary lens with relation to the principal lens $a'$ and to cause said auxiliary lens to be adjusted slightly, so that the beam transmitted by said auxiliary lens will be shifted laterally.

Substantially all headlights are arranged in pairs and have beams directed directly forwardly, so that each illuminates one-half of the path to be traveled by the vehicle and the marginal portions thereof. In foggy weather, if the path immediately in advance of the vehicle can be illuminated for a reasonable distance and the curb line of the road can be marked, sufficient illumination is provided for efficient driving at slow speeds. For this reason, it is desirable that the beams of both headlights have some lateral adjustment, so that they can be trained to cover only this portion of the road surface.

It is contemplated that the auxiliary lens e will be formed so that the convergent lenses of both headlights will strike adjacent a common spot and one toward the right of a prolongation forwardly of the longitudinal middle of said automobile.

The principal lens of headlights, or the reflectors thereof, are formed to produce a relatively shallow beam of light, but one which is substantially divergent, as has been set out before. The means by which said end is produced vary substantially. In some headlights the reflectors are separated into vertical bands having relatively plain surfaces, although the general form of the reflector is parabolic. In other headlights the lenses themselves comprise unitary sections of varying thickness to produce divergence of the direct and reflected rays given off from said headlight. Each particular type of lens produces slightly different conditions of divergence, because of the difference in refractive nature of the elements of said lens. Thus, to produce a beam of light having parallel rays, it is necessary that said beam of light pass thru a second lens, and in this case my auxiliary lens, which has exactly the opposite characteristic, that is, one which is produced by inverting the original or primary lens $a'$. Because of the numerous forms of lenses commonly used at the present time, I have shown but one type and this is construed only to be illustrative of the general type.

The auxiliary lens is preferably made of colored glass, so that the beam thrown off will be contrasting in color. Colored light seems to penetrate further into fog and to be distinguishable therefrom to a greater degree than white light. From my experiments, I have determined that an amber lens produces the best results and thus said lens e preferably is amber in color.

It is desirable that the operating rod $h$ be operable from some distant point, preferably from a point adjacent the instrument board of an automobile, and thus I have provided an electro-magnet $n$, which operates to throw said rod into its two positions alternately. The devices by which this is attained are diagrammatically illustrated by an electric circuit o, including a reversing switch $p$ and a source or accumulator of electrical energy illustrated by the battery $q$. Thus, if the reversing switch is moved into one position, electrical energy flows into one direction thru the coils of the electro-magnetic switch and if said switch is positioned oppositely, current also flows oppositely thru said coils. It is obvious to a person skilled in the art that mechanical means may be substituted for the electro-magnetic switch shown.

In Fig. 4 I show auxiliary lens $r$, which may be manually fitted in place and removed. The securing means for said lens comprise studs $s$, which are adapted to extend thru and seat in bayonet slots $t$ formed in the mounting of the auxiliary lens $r$.

I claim:

1. In a vehicle headlight provided with a principal lens relatively fixed across a beam of light and refractive to diverge said beam transversely, a translucent auxiliary lens normally out of registration with said principal lens, a linear track operatively engaging said auxiliary lens and extending to a point in which said auxiliary lens is in overlying registration with said principal lens, said auxiliary lens being refractive to a degree comparable to but opposed to the refractive character of said principal lens thereby to provide a relatively converging beam of light of greater intensity, and distant devices for moving said auxiliary lens along said track.

2. In a vehicle headlight provided with a principal lens relatively fixed across a beam of light and refractive to diverge said beam transversely, a translucent auxiliary lens normally out of registration with said principal lens, guiding means operatively engaging said auxiliary lens and adapted to arrange said auxiliary lens in overlying registration with said principal lens, said auxiliary lens being refractive to a degree comparable to but opposed to the refractive character of said principal lens thereby to provide a relatively converging beam of light of greater intensity, and secondary guiding means operatively engaging said auxiliary lens when the latter approaches registration with the principal lens.

JOSEPH L. STAFFORD.